Patented Nov. 17, 1942

2,302,079

UNITED STATES PATENT OFFICE 2,302,079

PROCESS FOR PRODUCING ENZYMES BY THE CULTIVATION OF MICRO-ORGANISMS ON NITROGEN AND CARBOHYDRATE-CONTAINING MASHES

Rudolf Waldmann, Strasbourg, France; vested in the Alien Property Custodian

No Drawing. Application April 7, 1939, Serial No. 266,680. In Switzerland April 11, 1938

3 Claims. (Cl. 195—96)

This invention relates to a process for producing enzymes by the cultivation of micro-organisms in nitrogen and carbohydrate-containing mashes. In order to produce bacterial enzymes, in accordance with this invention, the mash, which is inoculated with a culture of enzyme forming bacteria, is maintained either neutral or slightly alkaline during the cultivation period and the growth of the organisms is effected throughout the entire body of the mash by aeration throughout said body.

The production of enzymes by means of bacteria and mildew fungi is well known. Where such known processes were carried out under neutral conditions, they related solely to the production of diastatic enzymes by means of mildew fungi. The amylase formed by this type of process exhibits such a low saccharifying power that the amylase can only be used for thin mashes and is not capable of saccharifying carbohydrates of strong concentration. In so far as bacteria were used for the production of enzymes the operation was carried out by processes with which there were associated considerable defects due to the fact that the microbes were cultivated exclusively on the surface of mashes. The cultivation took place on the surface of the means of subsistence, because it was known that this method of cultivation leads to a satisfactory enzyme formation. In the production of diastatic enzymes by means of bacteria it was possible during the growth of the bacteria to observe physiological actions of two different types. When the bacteria grow on the surface of the mash, there is effected the formation of a large quantity of enzymes and the nutrient bed becomes alkaline. The same organisms however behave in a different manner when they grow below the surface. Under this condition they form very few enzymes and cause the nutrient bed to become acid. As a result of this knowledge it was believed that the means of subsistence must be kept in thin layers and in this manner the organisms were forced to grow solely on the surface. The maximum depth set out in earlier publications for the layer of the nutrient bed is given as 30 mm. It will be seen clearly that, in connection with the hitherto usual cultivation of bacteria, apparatus had to be used which was complicated and expensive and had a low capacity. By means of the present invention it is possible to cultivate bacteria with simple devices and in spite of this to treat unlimited quantities of raw materials and to produce a most effective final product.

Whereas when operating according to known processes, according to which bacteria are cultivated, air is allowed to flow over a thin layer of the nutrient bed, the mash according to the present invention is aerated throughout its entire depth. It is also of importance to adjust the action of the air to the prevailing conditions. Since it is possible to ascertain that the enzyme formation and the enzymatic power of the final product can be favorably influenced when large qauntities of air are supplied at predetermined periods of time during the period of growth, in the present invention provision is made for introducing the air in a condition which is as finely divided as possible.

In accordance with this invention, the cultivating mash preferably is maintained during the period of growth with a hydrogen ion concentration between about 7 and 8. I have found that a suitable predetermined value located between 7 and 8 and corresponding to the bacteria under treatment should be maintained. The exact hydrogen ion concentration value at which the mash is to be adjusted in each instance can readily be determined experimentally. The maintenance of the predetermined hydrogen ion concentration is insured by the use of a suitable buffer substance or a corresponding buffer mixture.

I have found it to be of advantage to use nutrient media in which more than 40 parts of carbohydrate-containing substances are used to one part of assimilable nitrogen. According to previous proposals for the composition of nutrient media for the cultivation of bacteria for the purpose of producing enzymes, there were adapted to be used for 1 part of assimilable nitrogen less than 40 parts of carbohydrates. According to the present invention, maximum yields can be obtained when the operation is carried out with a larger proportion of carbohydrate-containing substances. I have also found that the presence of aluminum salts in the nutrient medium have a favorable effect.

The following is an example of a process embodying my invention. In a vat having a capacity of 100 hectolitres, there are sterilized under pressure 700 hectolitres of a 3% starch solution, which solution contains 0.02% of nitrogen in the form of ammonium sulphate. During cooling there are added to each 1000 parts of the solution eight parts of a mixture of $KH_2PO_4$ and $K_2HPO_4$ as a buffer. The proportions of this electrolyte buffer mixture are so selected that the solution acquires and retains the pH value of 7.1. When the mash has cooled to 28° C., it is inoculated with a culture of an amylase-forming bacteria from the group mesentericus and then aerated for two days. In order to produce the fine aeration described above, there is used, for example, the filter stone or cup used in the yeast industry, any suitable mechanical fine aerating device or similarly acting devices. After two days the enzyme solution is clarified and filtered. In some cases it may be necessary to purify the solution by means of active carbon or other adsorption media. After the clarification and filtration, the enzyme solution is evaporated in a suitable vacuum apparatus. One kg. of the original enzyme solution is capable of converting 1000 to 3000 kg. of starch.

As the carbohydrate-containing part of the nutrient medium there may be used not only starch but also, for example, soluble starches and decomposition products of starch. As the nitrogen material there are suitable, in addition to the above-mentioned ammonium sulphate, other ammonium salts, as for example ammonium lactate. Other nitrogen compounds may also be used. The concentration of the starch solution given in the above example may be above or below that indicated. As to the buffering of the mash according to the invention, it has been found that in so far as salts are used for buffer purposes, certain salts are more suitable than others. For example, potassium salts are more suitable than sodium salts.

The vat may be made of aluminium or other metal which is coated with rubber or rendered inactive in any other suitable manner.

As enzyme-forming agents there may be used bacteria which are capable of forming diastatic enzymes, such as bacteria of the type subtilis or bacteria of the type mesentericus already mentioned above. It is also possible to apply the principles of this invention to the use of other types of bacteria by means of which other enzymes can be produced.

I claim:

1. The process for the manufacture of amylolytic enzymes by cultivating micro-organisms, consisting in preparing a sterile mash containing inorganic nitrogen and carbohydrates, one part of nitrogen for at least forty parts of carbohydrates, inoculating the mash with a pure culture of bacteria taken from the group consisting of *Bacillus mesentericus* and *Bacillus subtilis*, allowing said culture to grow in the entire depth of the mash, while both keeping the pH of said mash substantially between 7 and 8 and actively aerating the mash throughout its entire depth.

2. The process for the manufacture of amylolytic enzymes by cultivating bacteria, consisting in sterilizing a nutritive medium containing an ammonium salt and carbo-hydrates, the ratio of assimilable nitrogen to carbo-hydrates being one to more than forty, adding buffer substances to maintain the medium at a pH of substantially between 7 and 8 during the subsequent breeding period, inoculating said medium with bacteria taken from the group consisting of *Bacillus mesentericus* and *Bacillus subtilis*, and forcing air in finely divided form throughout the entire depth of the medium to cause said bacteria to grow in a submerged condition.

3. The process of improving the manufacture of amylolytic enzymes by cultivating bacteria taken from the group consisting of *Bacillus mesentericus* and *Bacillus subtilis*, which consists in preparing a sterile mash containing inorganic nitrogen and carbo-hydrates, one part of nitrogen for at least forty parts of carbo-hydrates, predetermining the hydrogen ion concentration corresponding in the best manner to the bacteria to be cultivated, which hydrogen concentration lies substantially between 7 and 8, adding buffer substances to maintain said mash at the predetermined pH during the subsequent cultivating period, inoculating the mash with the desired bacteria, and forcing air in finely divided form throughout the entire depth of the mash to cause said desired bacteria to grow in a submerged condition.

RUDOLF WALDMANN.